United States Patent
Aoyama et al.

(10) Patent No.: US 10,215,654 B2
(45) Date of Patent: Feb. 26, 2019

(54) PRESSURE DETECTION UNIT AND PRESSURE SENSOR USING THE SAME

(71) Applicant: FUJIKOKI CORPORATION, Tokyo (JP)

(72) Inventors: Tomohisa Aoyama, Tokyo (JP); Motohisa Mukai, Tokyo (JP); Youko Tamura, Tokyo (JP)

(73) Assignee: FUJIKOKI CORPORATION, Tokyo (JP)

( * ) Notice: Subject to any disclaimer, the term of this patent is extended or adjusted under 35 U.S.C. 154(b) by 90 days.

(21) Appl. No.: 15/429,519

(22) Filed: Feb. 10, 2017

(65) Prior Publication Data

US 2017/0234751 A1 Aug. 17, 2017

(30) Foreign Application Priority Data

Feb. 16, 2016 (JP) .................................. 2016-026706

(51) Int. Cl.
*G01L 19/00* (2006.01)
*G01L 9/00* (2006.01)
(Continued)

(52) U.S. Cl.
CPC ........ *G01L 19/0069* (2013.01); *G01L 9/0042* (2013.01); *G01L 19/00* (2013.01);
(Continued)

(58) Field of Classification Search
CPC ... G01L 19/147; G01L 9/0042; G01L 9/0072; G01L 13/025; G01L 19/04; G01L 9/0054;
(Continued)

(56) References Cited

U.S. PATENT DOCUMENTS 6,070,469 A * 6/2000 Taniguchi ........... G01L 19/0038
73/715
2009/0314096 A1* 12/2009 Colombo ............ G01L 19/0084
73/754
(Continued)

FOREIGN PATENT DOCUMENTS

EP 2034288 A2 3/2009
JP 2015004591 A 1/2015
(Continued)

OTHER PUBLICATIONS

Extended European Search Report of corresponding European Patent Appln. No. 17155940A dated Oct. 20, 2017.

*Primary Examiner* — Andre J Allen
(74) *Attorney, Agent, or Firm* — Bacon & Thomas, PLLC (57) ABSTRACT

A pressure detection unit and a pressure sensor using the same capable of suppressing an increase in manufacturing man-hours due to use of an additional member, and ensuring insulation of a semiconductor type pressure detection device. The pressure detection unit includes a base formed in a lid shape and made of ceramic, a receiving member formed in a plate shape, a diaphragm interposed between the base and the receiving member, a semiconductor type pressure detection device installed on a side of a pressure receiving space formed between the base and the diaphragm in the base, and terminal pins electrically connected to the semiconductor type pressure detection device. The terminal pins penetrate the base, where a metal layer is provided in a region around the semiconductor type pressure detection device on a surface of the base on the side of the pressure receiving space.

6 Claims, 6 Drawing Sheets

(51) Int. Cl.
   *G01L 19/06* (2006.01)
   *G01L 19/14* (2006.01)
(52) U.S. Cl.
   CPC ...... *G01L 19/0046* (2013.01); *G01L 19/0084* (2013.01); *G01L 19/0645* (2013.01); *G01L 19/0672* (2013.01); *G01L 19/14* (2013.01); *G01L 19/147* (2013.01)
(58) Field of Classification Search
   CPC ............... G01L 9/0075; G01L 19/0038; G01L 19/0084; G01L 19/14; G01L 19/0069; G01L 19/0618; G01L 19/0645; G01L 9/0055; G01L 9/0073; G01L 19/0092; G01L 19/143; G01L 9/0051; G01L 9/0052; G01L 11/025; G01L 19/0046; G01L 19/06; G01L 19/0627; G01L 19/0681; G01L 9/00; G01L 9/0041; G01L 9/0044; G01L 11/04; G01L 19/0007; G01L 19/0023; G01L 19/0672; G01L 19/069; G01L 19/142; G01L 19/16; G01L 27/002; G01L 7/00; G01L 7/163; G01L 7/166; G01L 9/0047; G01L 11/02; G01L 13/00; G01L 15/00; G01L 19/0609; G01L 19/083; G01L 19/10; G01L 19/148; G01L 7/08; G01L 9/0045; G01L 9/0048; G01L 9/006; G01L 9/007; G01L 9/0076; G01L 9/045; G01L 9/06; G01L 9/065; G01L 9/12; G01L 9/125; G01L 11/00; G01L 17/00; G01L 19/00; G01L 19/0015; G01L 19/003; G01L 19/0076; G01L 19/02; G01L 19/08; G01L 19/141; G01L 19/145; G01L 19/146; G01L 1/142; G01L 1/2262; G01L 1/246; G01L 21/12; G01L 23/16; G01L 27/005; G01L 27/007; G01L 7/04; G01L 7/063; G01L 7/082; G01L 7/084; G01L 7/086; G01L 7/16; G01L 9/0002; G01L 9/0007; G01L 9/0016; G01L 9/0019; G01L 9/0022; G01L 9/0027; G01L 9/0033; G01L 9/0039; G01L 9/005; G01L 9/0058; G01L 9/0077; G01L 9/0079; G01L 9/008; G01L 9/0092; G01L 9/0095; G01L 9/025; G01L 9/04; G01L 9/08; G01L 9/085; G01L 9/105; G01L 9/14; G01L 9/16
   USPC .................................................. 73/700–756
   See application file for complete search history.

(56) References Cited

U.S. PATENT DOCUMENTS

| | | |
|---|---|---|
| 2014/0260648 A1 | 9/2014 | Aoyama et al. |
| 2017/0234749 A1* | 8/2017 | Aoyama ............ G01L 19/0069 73/706 |
| 2017/0234750 A1* | 8/2017 | Aoyama ................ G01L 9/0042 73/706 |

FOREIGN PATENT DOCUMENTS

| | | |
|---|---|---|
| WO | WO2008036705 A2 | 3/2008 |
| WO | WO2015161904 A1 | 10/2015 |

* cited by examiner

PRESSURE DETECTION UNIT AND PRESSURE SENSOR USING THE SAME

TECHNICAL FIELD

The present invention relates to a pressure sensor, and particularly relates to a liquid filling type pressure detection unit that accommodates a semiconductor type pressure detection device, and a pressure sensor using the same.

BACKGROUND ART

A liquid filling type pressure sensor in which a semiconductor type pressure detection device is accommodated inside a pressure receiving chamber partitioned by a diaphragm to be filled with oil has been used to detect a refrigerant pressure by being installed in a refrigerator-freezer or an air conditioner, or to detect a pressure of supplied oil by being installed in a fuel feeder of a vehicle.

The semiconductor type pressure detection device is disposed inside the pressure receiving chamber, and has a function of converting a pressure change inside a pressure receiving space into an electric signal and outputting the converted electric signal to the outside.

The diaphragm disposed inside the pressure receiving space includes a flexible metal plate. Thus, depending on a usage environment, when a potential difference is generated between a pressure detection element including a semiconductor and a metal housing, or when injected oil is charged due to static electricity, etc., an electric charge may stay on a surface of the pressure detection element, and thus a defect may be generated in a detection operation of the pressure detection element.

In this regard, there has been a known pressure sensor that attempts to resolve the defect by further disposing a discharging plate inside the pressure receiving space in which the pressure detection element is accommodated, and connecting the discharging plate to zero potential of an electric circuit (see Patent Document 1).

CITATION LIST

Patent Document

Patent Document 1: JP 2014-178125 A

SUMMARY OF THE INVENTION

Problem to be Solved by the Invention

In the pressure sensor disclosed in Patent Document 1, normally, each of the base, the diaphragm, and the receiving member included in the pressure detector is formed using a metal material of stainless steel, etc. Thus, a plate obtained by providing a conductive layer on a surface made of a material having an insulating property such as ceramic, glass, etc. is disposed as the discharging plate.

However, in the pressure sensor disclosed in Patent Document 1, since the discharging plate is disposed in addition to the base, the diaphragm, and the receiving member, a process of processing the discharging plate and a process of attaching the discharging plate to the base are required. Thus, there is a concern that manufacturing man-hours may increase.

In addition, since the base is made of a metal material, for example, when a high voltage is applied to a system in which the pressure sensor is installed due to lightning, etc., a high voltage is instantaneously applied to the semiconductor type pressure detection device attached to the base, and there is a concern that detection accuracy of the semiconductor type pressure detection device may decrease.

In this regard, an object of the invention is to provide a pressure detection unit and a pressure sensor using the same capable of suppressing an increase in manufacturing man-hours due to use of an additional member, and ensuring insulation of the semiconductor type pressure detection device.

Means for Solving Problem

To achieve the above-mentioned object, a pressure detection unit according to the invention includes a base formed in a lid shape and made of ceramic, a receiving member formed in a plate shape, a diaphragm interposed between the base and the receiving member, a semiconductor type pressure detection device installed on a side of a pressure receiving space formed between the base and the diaphragm in the base, and terminal pins electrically connected to the semiconductor type pressure detection device, the terminal pins penetrating the base, wherein a metal layer is provided in a region around the semiconductor type pressure detection device on a surface of the base on the side of the pressure receiving space.

In a pressure detection unit according to an embodiment of the invention, the terminal pins include an earth terminal pin electrically connected to an earth pad of the semiconductor type pressure detection device, and a signal output terminal pin electrically connected to a signal output pad of the semiconductor type pressure detection device, a first brazing portion is formed between the base and the terminal pins, and the earth terminal pin is electrically connected through the metal layer and the first brazing portion.

In this instance, a metallized layer may be further formed between the base and the first brazing portion.

In addition, in a pressure detection unit according to an embodiment of the invention, a ring member is further interposed between the base and the diaphragm.

In this instance, a second brazing portion may be formed between the base and the ring member, and a metallized layer may be further formed between the base and the second brazing portion.

Further, the pressure detection unit may further include a caulking member that caulks and integrates the base and the receiving member from outer circumferential sides.

The pressure detection unit according to the invention may be used as a portion of a pressure sensor including a cover attached to wrap the pressure detection unit from an outer circumferential side, a lead wire having one end electrically connected to a terminal pin of the pressure detection unit and the other end protruding to an outside of the cover, and a fluid inlet pipe attached to a receiving member of the pressure detection unit.

Effect of the Invention

According to a pressure detection unit and a pressure sensor using the same of the invention, it is possible to suppress an increase in weight due to an additional member, and to ensure insulation of a semiconductor type pressure detection device.

In addition, the pressure detection unit and the pressure sensor using the same of the invention is less affected by expansion or contraction of a base due to a change in thermal environment, and thus may suppress a decrease in detection accuracy due to the change in thermal environment.

BRIEF DESCRIPTION OF DRAWINGS

FIGS. 1A and 1B depict a diagram illustrating an outline of a pressure detection unit according to Embodiment 1 of the invention, wherein

FIGS. 3A and 3B depict a diagram illustrating an outline of a pressure detection unit according to Embodiment 2 of the invention, wherein

MODE(S) FOR CARRYING OUT THE INVENTION

Embodiment 1

Figure 1A:
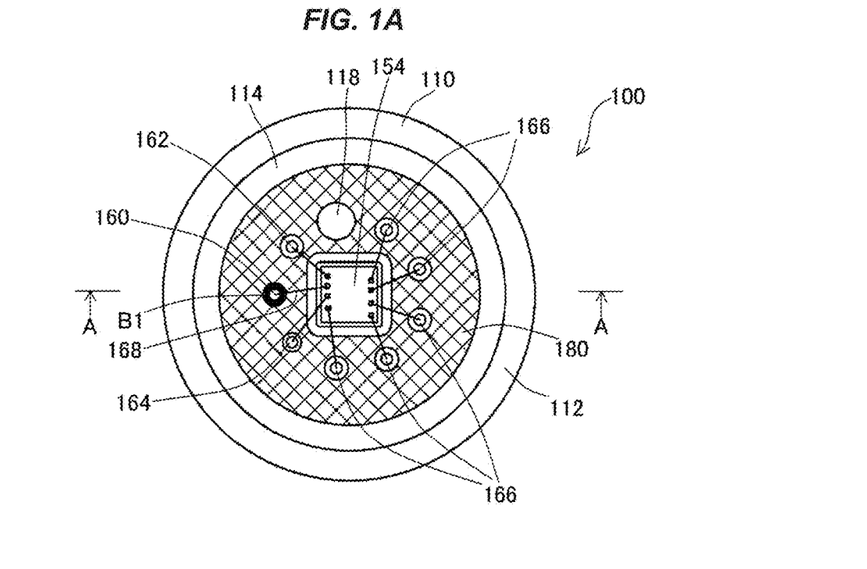
FIG. 1A illustrates a top view of the pressure detection unit.
Figure 1B:
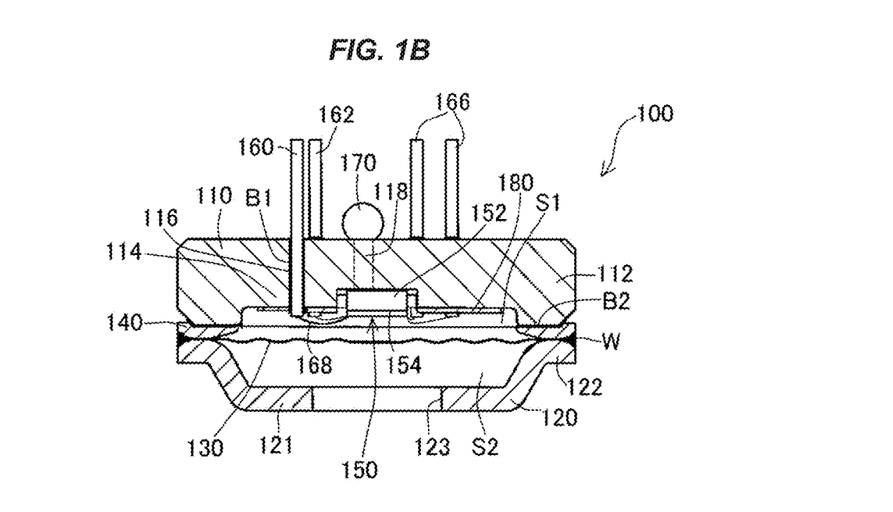
FIG. 1B illustrates a cross section taken along A-A line of FIG. 1A in side view.

FIGS. 1A and 1B depict an outline of a pressure detection unit according to Embodiment 1 of the invention. FIG. 1A illustrates a top view of the pressure detection unit, and FIG. 1B illustrates a cross section taken along A-A line of FIG. 1A in side view.

As illustrated in FIG. 1A, the pressure detection unit 100 according to Embodiment 1 of the invention includes a base 110 made of ceramic, a receiving member 120 facing the base 110, and a diaphragm 130 and a ring member 140 interposed between the base 110 and the receiving member 120.

The base 110 is a circular lid-shaped member in top view, and includes a ceramic material having an insulating property in which an outer circumferential portion 112 and an inner portion 114 having a smaller thickness than that of the outer circumferential portion 112 are integrated with each other as illustrated in FIG. 1B. That is, the base 110 has a shape in which a central portion thereof is recessed such that a pressure receiving space S1 described below is formed.

For example, a generally known material including an oxide such as alumina or zirconia, carbide such as silicon carbide, and a nitride such as silicon nitride may be used as the ceramic material included in the base 110.

The sealed pressure receiving space S1 is formed between the inner portion 114 of the base 110 and the diaphragm 130, and filled with a liquid medium having an insulating property such as oil.

In addition, a semiconductor type pressure detection device 150 described below is installed at a central portion on the pressure receiving space S1 side in the inner portion 114 of the base 110.

As illustrated in FIG. 1A, a plurality of through-holes (see reference numeral 116 of FIG. 1B) into which a plurality of terminal pins 160, 162, 164, and 166 is inserted is formed at positions around the semiconductor type pressure detection device 150 in the base 110.

Further, the plurality of terminal pins 160, 162, 164, and 166 is inserted into the plurality of through-holes 116, and one ends thereof are electrically connected to the semiconductor type pressure detection device 150.

In addition, an inflow hole 118 for filling the pressure receiving space S1 with the liquid medium is further formed in the base 110, and an inlet of the inflow hole 118 is sealed by, for example, joining a ball 170 thereto after filling with the liquid medium.

For example, the receiving member 120 is formed using a metal material such as a stainless steel plate, is a plate-shaped member subjected to press molding such that a central portion is recessed, and includes a cylindrical portion 121 having a bottom and a cylindrical shape and a flange portion 122 formed at an upper end of the cylindrical portion 121 (the receiving member 120 may be formed by cutting, etc. other than press molding).

An opening 123 for installing a fluid inlet pipe (described below) is formed on a bottom surface of the cylindrical portion 121, and the diaphragm 130 is joined to an upper surface of the flange portion 122.

According to this configuration, a pressurization space S2 into which a fluid to be detected flows is formed between the receiving member 120 and the diaphragm 130.

For example, the diaphragm 130 is formed as a disc-shaped thin plate member made of a metal material such as stainless steel. For example, the ring member 140 is formed as a ring-shaped member made of a metal material such as stainless steel.

Further, for example, the diaphragm 130 is subjected to girth welding by laser welding, etc. while being interposed between the receiving member 120 and the ring member 140. In this way, the receiving member 120, the diaphragm 130, and the ring member 140 are integrated to form a pressure receiving structure.

The semiconductor type pressure detection device 150 is die-bonded to the central portion of the base 110 using adhesion, etc. The semiconductor type pressure detection device 150 includes a support substrate 152 made of glass and a pressure detection element (semiconductor chip) 154 joined to the support substrate 152.

As an example thereof, for example, the pressure detection element 154 includes eight bonding pads (electrodes). Three of the bonding pads correspond to a power input pad for an output signal, an earth pad, and a signal output pad. Further, remaining five bonding pads correspond to signal adjustment pads.

As illustrated in FIG. 1A, an earth terminal pin 160, a power input terminal pin 162, a signal output terminal pin 164, and a plurality of adjustment terminal pins 166 are attached to the base 110 by penetrating the base 110 using brazing.

The earth terminal pin 160, the power input terminal pin 162, the signal output terminal pin 164, and the adjustment terminal pins 166 are electrically connected to the earth pad, the power input pad, the signal output pad, and the signal adjustment pads of the semiconductor type pressure detection device 150 described above through a bonding wire 168.

In the pressure detection unit 100 according to Embodiment 1 of the invention, a thin film-shaped metal layer 180 made of metal is formed in a region enclosing the semiconductor type pressure detection device 150 on a surface on the pressure receiving space S1 side in the inner portion 114 of the base 110.

For example, the metal layer 180 is formed by performing a metallization process on a metal material on a surface of a ceramic material.

Further, when a brazing portion described below (first brazing portion B1) is formed between the earth terminal pin 160 and the base 110 described above, the metal layer 180 is electrically connected to the earth terminal pin 160 through the first brazing portion B1.

As an example of a procedure of assembling the pressure detection unit 100 according to Embodiment 1 of the invention, first, the metal layer 180 is formed through the metallization process in the region enclosing the semiconductor type pressure detection device 150 on the surface on the pressure receiving space S1 side in the inner portion 114 of the base 110.

In this instance, a process of attaching the semiconductor type pressure detection device 150 to the base 110 and the metallization process of forming the metal layer 180 in the base 110 may be simultaneously performed.

Subsequently, the earth terminal pin 160, the power input terminal pin 162, the signal output terminal pin 164, and the adjustment terminal pins 166 are inserted into the through-holes 116 formed in the base 110, and the plurality of terminal pins 160, 162, 164, and 166 and the base 110 are subjected to brazing to form the first brazing portion B1, thereby joining and fixing the terminal pins 160, 162, 164, and 166 to the base 110 (see reference symbol B1 of FIG. 1A). In other words, the first brazing portion B1 is formed between ceramic of the base 110 and metal of the plurality of terminal pins 160, 162, 164, and 166 by performing heating at a predetermined temperature while a brazing material such as silver solder is interposed between the plurality of through-holes 116 formed in the base and the plurality of terminal pins 160, 162, 164, and 166.

In this instance, wettability of the ceramic material and the brazing material may be enhanced by forming a metallized layer (for example, a Mo—Mn layer, etc.) in advance on a surface coming into contact with the brazing material of the base 110 before a brazing operation is performed.

Subsequently, the base 110 is joined to an upper surface of the ring member 140 (a surface on an opposite side from a surface on which the diaphragm 130 is welded) using a second brazing portion B2.

In other words, the second brazing portion B2 is formed between ceramic of the base 110 and metal of the ring member 140 by performing heating at a predetermined temperature while a brazing material such as silver solder is interposed between the ring member 140 and the outer circumferential portion 112 of the base 110.

In this instance, wettability of the ceramic material and the brazing material may be enhanced by forming a metallized layer (for example, a Mo—Mn layer, etc.) in advance on a surface coming into contact with the brazing material of the outer circumferential portion 112 in the base 110 before a brazing operation is performed.

This metallization process of forming the metallized layer is preferably performed simultaneously with the metallization process of forming the metal layer 180 on the base 110 described above.

Subsequently, the semiconductor type pressure detection device 150 is die-bonded to the central portion of the base 110.

Thereafter, the earth pad, the power input pad, the signal output pad, and the adjustment pads of the semiconductor type pressure detection device 150 are electrically connected to the one ends of the plurality of terminal pins 160, 162, 164, and 166, respectively, through the bonding wire 168.

Subsequently, while the diaphragm 130 is interposed between the receiving member 120 and the ring member 140, an overlapping portion thereof is continuously girth-welded and integrated in an outer circumferential direction as described above.

In this instance, fusion welding such as laser welding or arc welding, or resistance welding such as seam welding may be applied to a girth welding scheme. However, it is preferable to apply laser welding, electron beam welding, etc. having a small heat input in consideration of a reduction in distortion due to welding.

Finally, the liquid medium is injected into the pressure receiving space S1 formed between the base 110 and the diaphragm 130 from the inflow hole 118 formed in the base 110, and then the ball 170 is joined to the inlet of the inflow hole 118 to seal the inlet.

In this instance, referring to joining of the ball 170 to the base 110, for example, a metallized layer may be formed in advance around the inflow hole 118 on an outer surface of the base 110, and the metallized layer and the ball 170 may be subjected to resistance welding, thereby attaching the ball 170 to the base 110.

Figure 2:
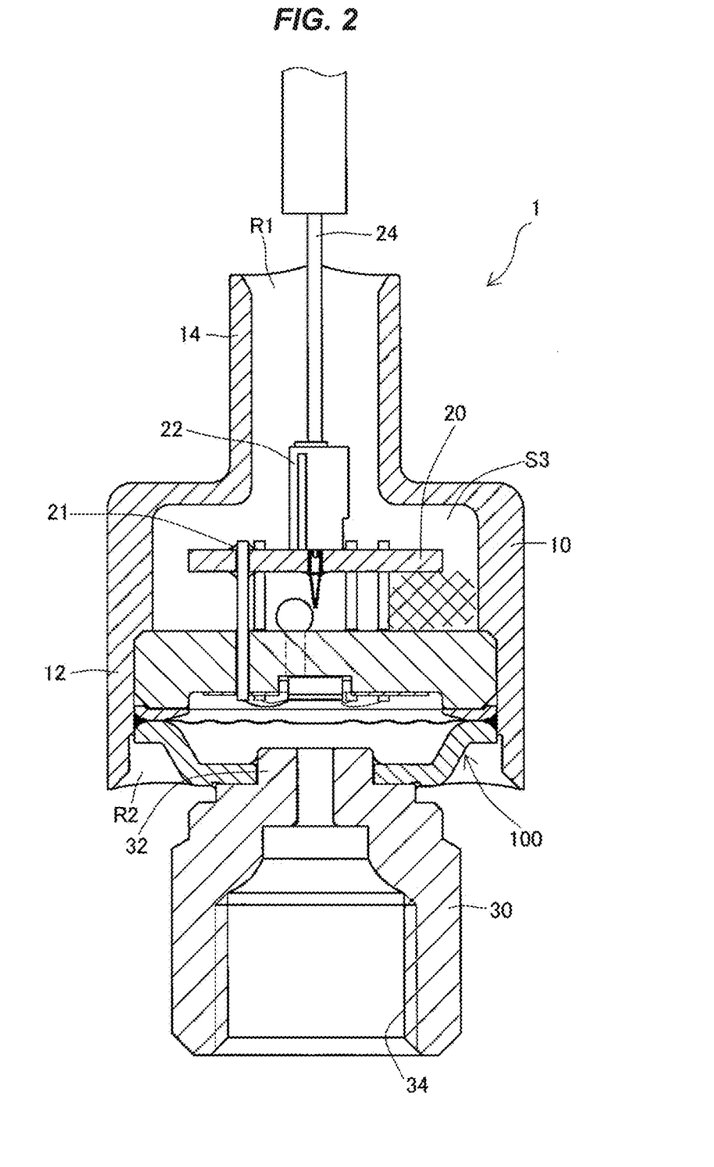
FIG. 2 is a longitudinal sectional view of a pressure sensor in which the pressure detection unit according to Embodiment 1 of the invention is installed.

FIG. 2 is a longitudinal sectional view of a pressure sensor in which the pressure detection unit according to Embodiment 1 of the invention illustrated in FIGS. 1A and 1B is installed.

As illustrated in FIG. 2, the pressure sensor 1 includes the pressure detection unit 100 according to Embodiment 1 of the invention illustrated in FIG. 1, a cylindrical cover 10 attached to the pressure detection unit 100, a relay board 20 to which the one ends of the terminal pins 160, 162, 164, and 166 protruding from the pressure detection unit 100 are attached, a connector 22 attached to the relay board 20, a lead wire 24 connected to the connector 22 to exchange an electrical signal, etc. with external equipment, and a fluid inlet pipe 30 attached to the receiving member 120 of the pressure detection unit 100.

The cover 10 is a member having a stepped cylindrical shape including a large diameter portion 12 and a small diameter portion 14, and is attached to the pressure detection unit 100 from the base 110 side in a mode in which the large diameter portion 12 encloses an outer circumferential portion of the pressure detection unit 100.

As illustrated in FIG. 2, an inner space S3, which uses the base 110 as a bottom surface, is formed inside the cover 10, and the relay board 20 and the connector 22 described below are accommodated in the inner space S3.

The inner space S3 formed inside the cover 10 is filled with a resin R1, and the resin R1 is solidified. Further, an opening end side of the large diameter portion 12 is filled with a resin R2 in a mode in which the pressure detection unit 100 is covered with the resin R2, and the resin R2 is solidified.

These resins R1 and R2 prevent water, etc. from penetrating into the cover 10 to protect an electric system of the relay board 20, etc.

The relay board 20 is formed as a baking board, a glass epoxy board, a ceramic board, or a flexible board, one end of the connector 22 is attached to a central portion of the relay board 20, and a via electrode and a metal wiring layer (not illustrated) are included around a position at which the connector 22 is attached to the central portion.

The one end of the connector 22 is attached to the relay board 20, and the lead wire 24 extending to an outside of the cover 10 is attached to the other end of the connector 22.

In addition, each of the one ends of the plurality of terminal pins 160, 162, 164, and 166 protruding from the base 110 of the pressure detection unit 100 is anchored to a via electrode of the relay board 20 by penetrating thereto.

In this instance, for example, the earth terminal pin 160, the power input terminal pin 162, and the signal output terminal pin 164 are anchored to the via electrode using soldering, etc., and are electrically anchored and connected to an electric circuit including the via electrode.

For example, the fluid inlet pipe 30 is a pipe-shaped member made of a metal material such as a copper alloy, an aluminum alloy, etc. and includes an attachment portion 32 attached to the receiving member 120 of the pressure detection unit 100 and a connection portion 34 connected to a pipe through which a fluid subjected to pressure detection flows.

The attachment portion 32 is attached to the opening 123 of the receiving member 120 illustrated in FIGS. 1A and 1B using an arbitrary scheme such as welding, adhesion, mechanical fastening, etc.

When the pressure sensor 1 illustrated in FIG. 2 is assembled, first, the relay board 20, to which the connector 22 is attached, is anchored to the one ends of the plurality of terminal pins 160, 162, 164, and 166 protruding from the base 110 of the pressure detection unit 100.

Meanwhile, the attachment portion 32 of the fluid inlet pipe 30 is attached and fixed to the opening 123 of the receiving member 120 of the pressure detection unit 100.

Subsequently, the pressure detection unit 100 is inserted into the large diameter portion 12 of the cover 10 such that the lead wire 24 is exposed to the outside through the small diameter portion 14 by being inserted from the large diameter portion 12.

Thereafter, the resin R1 is injected from the opening of the cover 10 on the small diameter portion 14, and the resin R1 is solidified, thereby sealing the inner space S3.

Similarly, the resin R2 is injected from an opening end on the large diameter portion 12 side, and the resin R2 is solidified, thereby fixing the pressure detection unit 100 inside the cover 10.

In the pressure sensor 1 illustrated in FIG. 2, the fluid subjected to pressure detection and introduced to the fluid inlet pipe 30 enters the pressurization space S2 of the pressure detection unit 100, and deforms the diaphragm 130 at a pressure thereof.

When the diaphragm 130 is deformed, the liquid medium inside the pressure receiving space S1 is pressurized, and the pressure at which the diaphragm 130 is deformed is delivered to the pressure detection element 154 of the semiconductor type pressure detection device 150.

The pressure detection element 154 detects a change in the delivered pressure, converts the change into an electrical signal, and outputs the electrical signal to the relay board 20 through the signal output terminal pin 164.

Then, the electrical signal is delivered to a wiring layer of the relay board 20, and output to external equipment through the connector 22 and the lead wire 24.

When these configurations are included, even when the pressure sensor 1 is charged due to a certain reason, the pressure detection unit 100 according to Embodiment 1 of the invention and the pressure sensor 1 to which the pressure detection unit 100 is applied may preferentially concentrate charges on the metal layer 180 formed on the surface of the base 110, which is formed using the ceramic material having the insulating property, on the pressure receiving space S1 side, and allow charges to escape to the outside through the earth terminal pin 160.

In this instance, since a configuration in which the metal layer 180 is formed on an inner surface of the base 110 made of the ceramic material is employed instead of a conventional configuration in which a discharging plate is additionally provided, a process of processing the discharging plate and a process of attaching the discharging plate to the base are unnecessary, and electricity may be effectively removed from the pressure sensor 1 without increasing manufacturing man-hours.

Further, for example, when high-tension electricity accidentally flows through a flow passage through which the fluid subjected to pressure detection circulates due to lightning, etc., electricity attempting to flow through the fluid inlet pipe 30 and the receiving member 120 is blocked by the base 110 made of the ceramic material, and thus it is possible to reduce damage to the semiconductor type pressure detection device 150.

In addition, when the base 110 is formed using the ceramic material, a thermal expansion coefficient of the base 110 is smaller than that of a conventional base formed using a metal material. Thus, even when the base 110 is exposed to a touch usage environment of a high temperature or a low temperature, a change in shape or dimensions of the base 110 is small. As a result, it is possible to suppress a decrease in detection accuracy due to a thermal environment of the semiconductor type pressure detection device 150.

In addition, when the base 110 is formed using the ceramic material, a hermetic seal made of glass, which is used when a terminal pin is buried in a base in a pressure detection unit having a conventional type, may be replaced by a brazing portion. Thus, it is possible to prevent a fragile hermetic seal portion from being damaged to prevent the liquid medium that fills the pressure receiving space from leaking.

Further, the pressure detection unit 100 according to Embodiment 1 of the invention and the pressure sensor 1 to which the pressure detection unit 100 is applied form the pressure receiving structure in which the receiving member 120, the diaphragm 130, and the ring member 140 are integrated by interposing the diaphragm 130 between the receiving member 120 and the ring member 140 in advance, and have a structure in which the base 110 is joined to the ring member 140 of the pressure receiving structure. Thus, the diaphragm 130, which is a thin plate and relatively weak, may be reinforced by the receiving member 120 and the ring member 140.

In addition, when the base 110 is joined to the pressure receiving structure, only positioning between the base 110 and the ring member 140 may be performed. Thus, it is possible to simplify a joining operation, and to improve shape accuracy of the pressure detection unit 100.

Embodiment 2

Figure 3A:
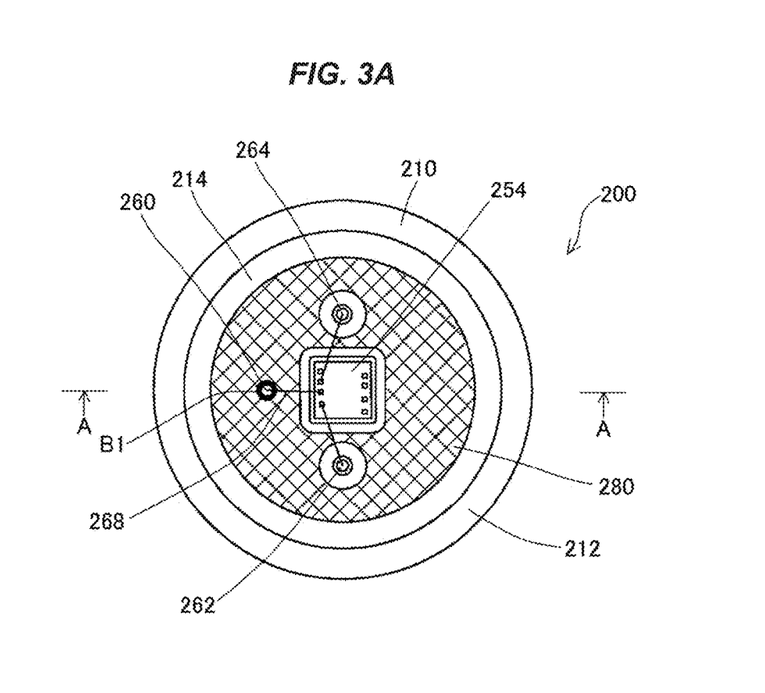
FIG. 3A illustrates a top view of the pressure detection unit.
Figure 3B:
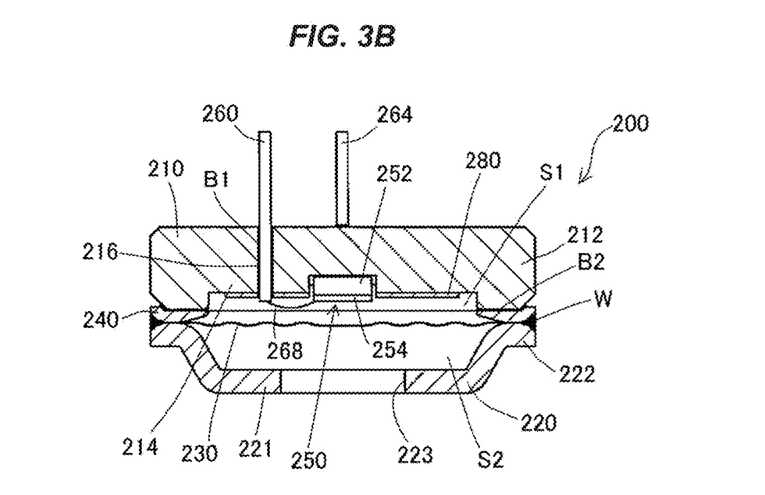
FIG. 3B illustrates a cross section taken along A-A line of FIG. 3A in side view.

FIGS. 3A and 3B illustrate an outline of a pressure detection unit according to Embodiment 2 of the invention. FIG. 3A illustrates a top view of the pressure detection unit, and FIG. 3B illustrates a cross section taken along A-A line of FIG. 3A in side view.

As illustrated in FIGS. 3A and 3B, the pressure detection unit 200 according to Embodiment 2 of the invention includes a base 210 made of ceramic, a receiving member 220 facing the base 210, and a diaphragm 230 and a ring member 240 interposed between the base 210 and the receiving member 220.

Similarly to Embodiment 1, the base 210 is a circular lid-shaped member in top view, and includes a ceramic material having an insulating property in which an outer circumferential portion 212 and an inner portion 214 having a smaller thickness than that of the outer circumferential portion 212 are integrated with each other as illustrated in FIG. 3B. That is, the base 210 has a shape in which a central portion thereof is recessed such that a pressure receiving space S1 described below is formed.

In addition, similarly to Embodiment 1, a generally known material including an oxide such as alumina or zirconia, carbide such as silicon carbide, and a nitride such as silicon nitride may be used as the ceramic material included in the base 210.

The pressure receiving space S1 is formed between the inner portion 214 of the base 210 and the diaphragm 230, and filled with a liquid medium having an insulating property such as oil.

In addition, a semiconductor type pressure detection device 250 described below is installed at a central portion on the pressure receiving space S1 side in the inner portion 214 of the base 210.

As illustrated in FIG. 3A, a plurality of through-holes (see reference numeral 216 of FIG. 3B) into which three terminal pins 260, 262, and 264 described below are inserted is formed at positions around the semiconductor type pressure detection device 250 in the base 210.

Further, the three terminal pins 260, 262, and 264 are inserted into the plurality of through-holes 216, and one ends thereof are electrically connected to the semiconductor type pressure detection device 250.

Similarly to Embodiment 1, for example, the receiving member 220 is formed using a metal material such as a stainless steel plate, is a plate-shaped member subjected to press molding such that a central portion is recessed, and includes a cylindrical portion 221 having a bottom and a cylindrical shape and a flange portion 222 formed at an upper end of the cylindrical portion 221 (the receiving member 220 may be formed by cutting, etc. other than press molding).

An opening 223 for installing a fluid inlet pipe described below is formed on a bottom surface of the cylindrical portion 221, and the diaphragm 230 is joined to an upper surface of the flange portion 222.

According to this configuration, a pressurization space S2 into which a fluid to be detected flows is formed between the receiving member 220 and the diaphragm 230.

For example, the diaphragm 230 is formed as a disc-shaped thin plate member made of a metal material such as stainless steel. For example, the ring member 240 is formed as a ring-shaped member made of a metal material such as stainless steel.

Further, for example, the diaphragm 230 is subjected to girth welding by laser welding, etc. while being interposed between the receiving member 220 and the ring member 240. In this way, the receiving member 220, the diaphragm 230, and the ring member 240 are integrated to form a pressure receiving structure.

The semiconductor type pressure detection device 250 is die-bonded to the central portion of the base 210 using adhesion, etc. The semiconductor type pressure detection device 250 includes a support substrate 252 made of glass and a pressure detection element (semiconductor chip) 254 joined thereto. For example, the pressure detection element 254 includes eight bonding pads (electrodes). Three of the bonding pads correspond to a power input pad for an output signal, an earth pad, and a signal output pad. Further, remaining five bonding pads correspond to signal adjustment pads.

As illustrated in FIG. 3A, an earth terminal pin 260, a power input terminal pin 262, and a signal output terminal pin 264 are attached to the base 210 by penetrating the base 210 using brazing.

The earth terminal pin 260, the power input terminal pin 262, and the signal output terminal pin 264 are electrically connected to the earth pad, the power input pad, and the signal output pad of the semiconductor type pressure detection device 250 described above through a bonding wire 268.

In the pressure detection unit 200 according to Embodiment 2 of the invention, similarly to Embodiment 1, a thin film-shaped metal layer 280 made of metal obtained by performing a metallization process on a metal material on a surface of a ceramic material is formed in a region enclosing the semiconductor type pressure detection device 150 on a surface on the pressure receiving space S1 side in the inner portion 214 of the base 210.

Further, when a brazing portion described below (first brazing portion B1) is formed between the earth terminal pin 260 and the base 210 described above, the metal layer 280 is electrically connected to the earth terminal pin 260 through the first brazing portion B1.

As an example of a procedure of assembling the pressure detection unit 200 according to Embodiment 2 of the invention, first, the metal layer 280 is formed through the metallization process in the region enclosing the semiconductor type pressure detection device 150 on the surface on the pressure receiving space S1 side in the inner portion 214 of the base 210.

In this instance, similarly to Embodiment 1, a process of attaching the semiconductor type pressure detection device 250 to the base 210 and the metallization process of forming the metal layer 280 in the base 210 may be simultaneously performed.

Subsequently, similarly to Embodiment 1, the earth terminal pin 260, the power input terminal pin 262, and the signal output terminal pin 264 are inserted into the through-holes 216 formed in the base 210, and the earth terminal pin 260, the power input terminal pin 262, and the signal output terminal pin 264 are joined and fixed to the base 210 by forming the first brazing portion B1 using brazing.

In this instance, a metallized layer (for example, a Mo—Mn layer, etc.) may be formed in advance on a surface coming into contact with the brazing material of the base 210 before a brazing operation is performed.

Subsequently, the base 210 is joined to an upper surface of the ring member 240 (a surface on an opposite side from a surface on which the diaphragm 230 is welded) using a second brazing portion B2.

In other words, the second brazing portion B2 is formed between the ceramic material of the base 210 and the metal material of the ring member 240 by performing heating at a predetermined temperature while, for example, a brazing material such as silver solder is interposed between the ring member 240 and the outer circumferential portion 212 of the base 210.

In this instance, wettability of the ceramic material and the brazing material may be enhanced by forming a metallized layer (for example, a Mo—Mn layer, etc.) in advance on a surface coming into contact with the brazing material of the outer circumferential portion 212 in the base 210 before a brazing operation is performed.

This metallization process of forming the metallized layer is preferably performed simultaneously with the metallization process of forming the metal layer 280 on the base 210 described above.

Subsequently, the semiconductor type pressure detection device 250 is die-bonded to the central portion of the base 210.

Thereafter, the earth pad, the power input pad, and the signal output pad of the semiconductor type pressure detection device 250 are electrically connected to the one ends of the three terminal pins 260, 262, and 264, respectively, through the bonding wire 268.

Finally, as described in the foregoing, an overlapping portion of the receiving member 220 and the ring member 240 is continuously subjected to girth welding in an outer circumferential direction and integrated while the diaphragm 230 is interposed between the receiving member 220 and the ring member 240, and the pressure receiving space S1 formed between the base 210 and the diaphragm 230 is filled with the liquid medium.

In this instance, fusion welding such as laser welding or arc welding, or resistance welding such as seam welding may be applied to a girth welding scheme. However, it is preferable to apply laser welding, electron beam welding, etc. having a small heat input in consideration of a reduction in distortion due to welding.

Figure 4:
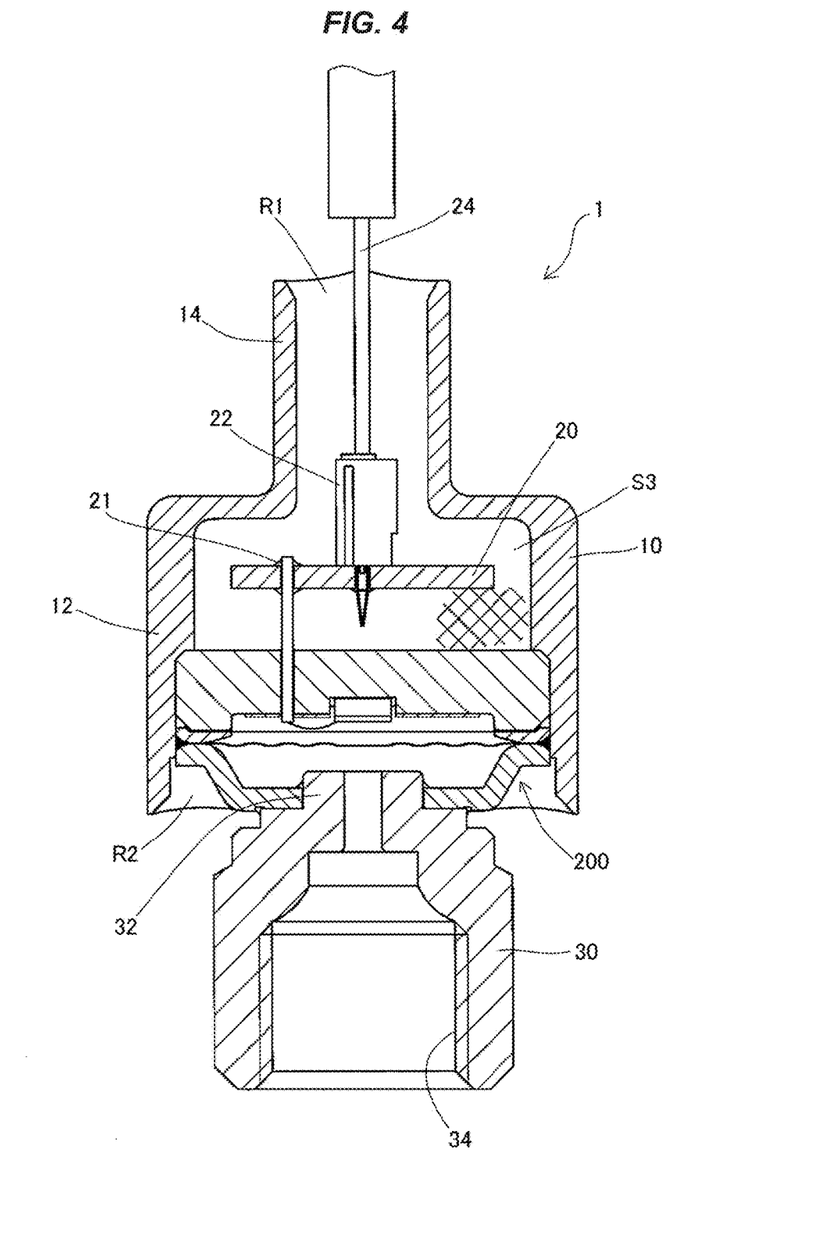
FIG. 4 is a longitudinal sectional view of a pressure sensor in which the pressure detection unit according to Embodiment 2 of the invention is installed.

FIG. 4 is a longitudinal sectional view of a pressure sensor in which the pressure detection unit according to Embodiment 2 of the invention illustrated in FIGS. 3A and 3B is installed.

As illustrated in FIG. 4, the pressure sensor 1 includes the pressure detection unit 200 according to Embodiment 2 of the invention illustrated in FIGS. 3A and 3B, a cylindrical cover 10 attached to the pressure detection unit 200, a relay board 20 to which the one ends of the three terminal pins 260, 262, and 264 protruding from the pressure detection unit 200 are attached, a connector 22 attached to the relay board 20, a lead wire 24 connected to the connector 22 to exchange an electrical signal, etc. with external equipment, and a fluid inlet pipe 30 attached to the receiving member 220 of the pressure detection unit 200.

In the pressure sensor 1 according to Embodiment 2 illustrated in FIG. 4, the cover 10 and the fluid inlet pipe 30 have the same configurations as those in Embodiment 1. Thus, herein, the same reference numerals will be assigned thereto, and a description thereof will be omitted.

In addition, the resin R1 that fills the inner space S3 formed inside the cover 10 and the resin R2 that fills the opening end side of the large diameter portion 12 of the cover 10 in a mode in which the pressure detection unit 200 is covered have the same configurations as those in Embodiment 1.

As illustrated in FIG. 4, the relay board 20 and the connector 22 described below are accommodated in the inner space S3 of the cover 10.

Each of the one ends of the three terminal pins 260, 262, and 264 protruding from the base 210 of the pressure detection unit 200 is anchored to the via electrode of the relay board 20 in Embodiment 2 by penetrating thereto.

In this instance, for example, the three terminal pins 260, 262, and 264 are electrically anchored and connected to the via electrode using soldering, etc.

When the pressure sensor 1 illustrated in FIG. 4 is assembled, first, the relay board 20 attached to the connector 22 is anchored to the one ends of the three terminal pins 260, 262, and 264 protruding from the base 210 of the pressure detection unit 200.

Meanwhile, the attachment portion 32 of the fluid inlet pipe 30 is attached and fixed to the opening 223 of the receiving member 220 of the pressure detection unit 200.

Subsequently, the pressure detection unit 200 is inserted into the large diameter portion 12 of the cover 10 such that the lead wire 24 is exposed to the outside through the small diameter portion 14 by being inserted thereto from the large diameter portion 12.

Thereafter, the resin R1 is injected from the opening on the small diameter portion 14 side of the cover 10 and solidified, thereby sealing the inner space S3.

Similarly, the resin R2 is injected from the opening end on the large diameter portion 12 side and solidified, thereby fixing the pressure detection unit 200 inside the cover 10.

In the pressure sensor 1 illustrated in FIG. 4, the fluid subjected to pressure detection and introduced to the fluid inlet pipe 30 enters the pressurization space S2 of the pressure detection unit 200, and deforms the diaphragm 230 at a pressure thereof.

When the diaphragm 230 is deformed, the liquid medium inside the pressure receiving space S1 is pressurized, and the pressure at which the diaphragm 230 is deformed is delivered to the pressure detection element 254 of the semiconductor type pressure detection device 250.

The pressure detection element 254 detects a change in the delivered pressure, converts the change into an electrical signal, and outputs the electrical signal to the relay board 20 through the signal output terminal pin 264.

Then, the electrical signal is delivered to a wiring layer of the relay board 20, and output to external equipment through the connector 22 and the lead wire 24.

In addition to the effect in Embodiment 1, the pressure detection unit 200 according to Embodiment 2 of the invention and the pressure sensor 1 to which the pressure detection unit 200 is applied may reduce the number of terminal pins installed by penetrating the base 210 to three by including these configurations. Therefore, it is possible to reduce weight associated with the reduction in the terminal pins, and reduce brazing places. Thus, it is possible to reduce an effort in a joining process.

In addition, when the terminal pins are reduced, through-holes for insertion of the terminal pins formed in the base 210 are reduced. Therefore, it is possible to suppress a decrease in strength of the base 210, and to minimize a transfer path of common mode noise transferred from a pipe, etc. Accordingly, it is possible to reduce a decrease in detection accuracy resulting from detection of noise by the semiconductor type pressure detection device 150.

Embodiment 3

Figure 5:
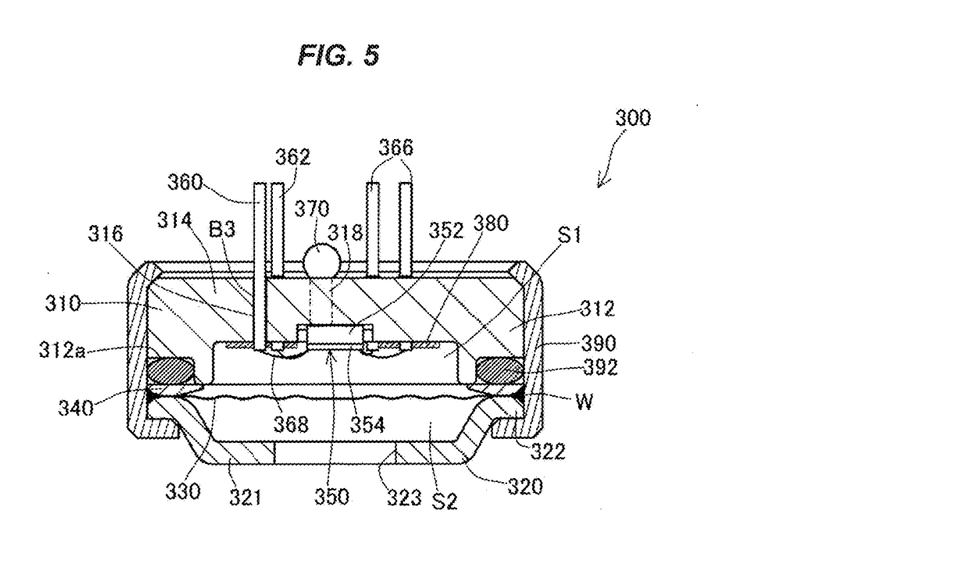
FIG. 5 is a longitudinal sectional view of a cross section passing through a central line of a pressure detection unit according to Embodiment 3 of the invention when seen from a side view.

FIG. 5 is a longitudinal sectional view of a cross section passing through a central line of a pressure detection unit according to Embodiment 3 of the invention when seen from a side view.

As illustrated in FIG. 5, the pressure detection unit 300 according to Embodiment 3 of the invention includes a base 310 made of ceramic, a receiving member 320 facing the base 310, a diaphragm 330 and a ring member 340 interposed between the base 310 and the receiving member 320, and a caulking member 390 that integrally fixes the base 310 and the receiving member 320 from an outer circumferential side.

Similarly to Embodiment 1, the base 310 is a circular lid-shaped member in a top view, and includes a ceramic material having an insulating property in which an outer circumferential portion 312 and an inner portion 314 having a smaller thickness than that of the outer circumferential portion 312 are integrated with each other as illustrated in FIG. 5. That is, the base 310 has a shape in which a central portion thereof is recessed such that a pressure receiving space S1 described below is formed.

In addition, a ring-shaped notch portion 312a, which is open in an outer circumferential direction, is formed at a lower end of the outer circumferential portion 312, and a sealing member 392 such as an O-ring described below is attached to the notch portion 312a.

The pressure receiving space S1 is formed between the inner portion 314 of the base 310 and the diaphragm 330, and filled with a liquid medium having an insulating property such as oil.

In addition, similarly to Embodiment 1, a semiconductor type pressure detection device 350 described below is installed at a central portion on the pressure receiving space S1 side in the inner portion 314 of the base 310.

As illustrated in FIG. 5, a plurality of through-holes 316 into which a plurality of terminal pins 360, 364, and 366 is inserted is formed at positions around the semiconductor type pressure detection device 350 in the base 310.

Further, the plurality of terminal pins 360, 364, and 366 is inserted into the plurality of through-holes 316, and one ends thereof are electrically connected to the semiconductor type pressure detection device 350.

In addition, an inflow hole 318 for filling the pressure receiving space S1 with the liquid medium is further formed in the base 310, and an inlet of the inflow hole 318 is sealed by, for example, joining a ball 370 thereto after filling with the liquid medium.

Similarly to Embodiment 1, for example, the receiving member 320 is formed using a metal material such as a stainless steel plate, is a plate-shaped member subjected to press molding such that a central portion is recessed, and includes a cylindrical portion 321 having a bottom and a cylindrical shape and a flange portion 322 formed at an upper end of the cylindrical portion 321 (the receiving member 320 may be formed by cutting, etc. other than press molding).

An opening 323 for installing a fluid inlet pipe (see reference numeral 34 of FIG. 6) is formed on a bottom surface of the cylindrical portion 321, and the diaphragm 330 is joined to an upper surface of the flange portion 322.

According to such a configuration, a pressurization space S2 into which a fluid to be detected flows is formed between the receiving member 320 and the diaphragm 330.

Similarly to Embodiment 1, the diaphragm 330 is formed as a disc-shaped thin plate member made of a metal material, and the ring member 340 is formed as a ring-shaped member made of a metal material.

Further, the diaphragm 330 is subjected to girth welding while being interposed between the receiving member 320 and the ring member 340. In this way, the receiving member 320, the diaphragm 330, and the ring member 340 are integrated to form a pressure receiving structure.

Similarly to Embodiment 1, the semiconductor type pressure detection device 350 includes a support substrate 352 made of glass and a pressure detection element (semiconductor chip) 354 joined to the support substrate 352, and is die-bonded to the central portion of the base 310 using adhesion, etc.

The pressure detection element 354 includes a power input pad for an output signal, an earth pad, a signal output pad, and a signal adjustment pad similar to those of Embodiment 1.

As illustrated in FIG. 5, an earth terminal pin 360, a power input terminal pin (not illustrated), a signal output terminal pin 364, and a plurality of adjustment terminal pins 366 are attached to the base 310 by penetrating the base 310 using brazing.

The earth terminal pin 360, the signal output terminal pin 362, the power input terminal pin, and the adjustment terminal pins 366 are electrically connected to the earth pad, the signal output pad, the power input pad, and the signal adjustment pad of the semiconductor type pressure detection device 350 described above through a bonding wire 368.

For example, the caulking member 390 is a ring-shaped member made of a metal material and disposed to surround outer circumferences of the base 310 and the receiving member 320 while the base 310 and the receiving member 320 are overlapped each other, and an upper end portion and a lower end portion thereof are integrated and fixed to each other by being subjected to plastic deformation to an inner circumferential side using a caulking device (not illustrated).

When such a configuration is employed, a degree of adhesion between the base 310 and the receiving member 320 (or the ring member 340) is improved, and a structure of surrounding an outer circumferential side of an overlapping portion thereof is obtained. Thus, higher air tightness or water tightness may be ensured.

As an example of a procedure of assembling the pressure detection unit 300 according to Embodiment 3 of the invention, first, a metal layer 380 is formed through a metallization process in a region enclosing the semiconductor type pressure detection device 350 on a surface on the pressure receiving space S1 side in the inner portion 314 of the base 310.

In this instance, a process of attaching the semiconductor type pressure detection device 350 to the base 310 and the metallization process of forming the metal layer 380 in the base 310 may be simultaneously performed.

Subsequently, the earth terminal pin 360, the power input terminal pin, the signal output terminal pin 364, and the adjustment terminal pins 366 are inserted into the through-holes 316 formed in the base 310, and the terminal pins 360 to 366 and the base 310 are subjected to brazing to form a brazing portion, thereby joining and fixing the terminal pins 360 to 366 to the base 310 (see reference symbol B3 of FIG. 3A).

In other words, similarly to Embodiment 1, the brazing portion B3 is formed between ceramic of the base 310 and metal of the terminal pins 360 to 366 by performing heating at a predetermined temperature while a brazing material such as silver solder is interposed between the through-holes 316 formed in the base 310 and the terminal pins 360 to 366.

In this instance, a metallized layer (for example, a Mo—Mn layer, etc.) may be formed in advance on a surface coming into contact with the brazing material of the base 310 before a brazing operation is performed.

Subsequently, the semiconductor type pressure detection device 350 is die-bonded to the central portion of the base 310.

Thereafter, the earth pad, the signal output pad, the power input pad, and the adjustment pads of the semiconductor type pressure detection device 350 are electrically connected to the one ends of the plurality of terminal pins 360 to 366, respectively, through the bonding wire 368.

Subsequently, while the diaphragm 330 is interposed between the receiving member 320 and the ring member 340, the overlapping portion is continuously subjected to girth welding from an outer circumferential direction as described above.

In this instance, fusion welding such as laser welding or arc welding, or resistance welding such as seam welding may be applied to a girth welding scheme. However, it is preferable to apply laser welding, electron beam welding, etc. having a small heat input in consideration of a reduction in distortion due to welding.

Subsequently, the base 310 is overlapped with an upper surface of the ring member 340 girth-welded to the receiving member 320 while the sealing member 392 such as an O-ring is attached to the notch portion 312a formed at the lower end of the outer circumferential portion 312 of the base 310, and the base 310 is caulked and fixed by the caulking member 390 and integrated therewith.

In this instance, a height and a width of the sealing member 392 are selected such that the height and the width are slightly larger dimensions than a height and a width of the notch portion 312a formed in the base 310. In this way, compression is performed in a vertical direction and a left-right direction inside the notch portion 312a at the time of caulking and fixing, and thus reliable air tightness and water tightness may be ensured.

Finally, after a liquid medium is injected into the pressure receiving space S1 formed between the base 310 and the diaphragm 33 from the inflow hole 318 formed in the base 310, the ball 370 is joined to the inlet of the inflow hole 318 to seal the inlet.

In this instance, referring to joining of the ball 370 to the base 310, similarly to Embodiment 1, a metallized layer may be formed in advance around the inflow hole 318 on an outer surface of the base 310, and the metallized layer and the ball 370 are subjected to resistance welding.

Figure 6:
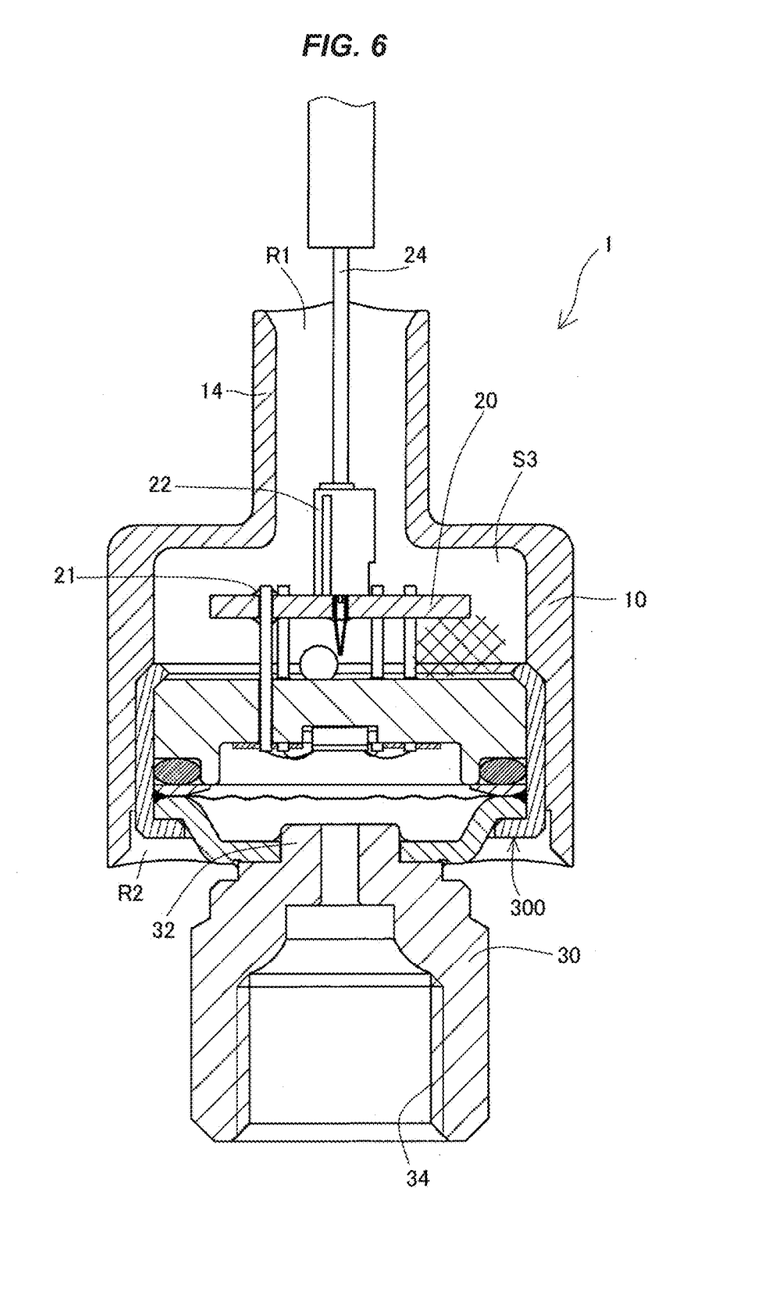
FIG. 6 is a longitudinal sectional view of a pressure sensor in which the pressure detection unit according to Embodiment 3 of the invention is installed.

FIG. 6 is a longitudinal sectional view of a pressure sensor in which the pressure detection unit according to Embodiment 3 of the invention illustrated in FIG. 5 is installed.

As illustrated in FIG. 6, the pressure sensor 1 includes the pressure detection unit 300 according to Embodiment 3 of the invention illustrated in FIG. 5, a cylindrical cover 10 attached to the pressure detection unit 300, a relay board 20 to which the one ends of the terminal pins 360 to 366 protruding from the pressure detection unit 300 are attached, a connector 22 attached to the relay board 20, a lead wire 24 connected to the connector 22 to exchange an electrical signal, etc. with external equipment, and a fluid inlet pipe 30 attached to the receiving member 320 of the pressure detection unit 300.

Similarly to Embodiment 1, the cover 10 is a member having a stepped cylindrical shape including a large diameter portion 12 and a small diameter portion 14, and is attached to the pressure detection unit 300 from the base 310 side in a mode in which the large diameter portion 12 encloses the caulking member 390 of the pressure detection unit 300.

As illustrated in FIG. 6, an inner space S3, which uses the base 310 as a bottom surface, is formed inside the cover 10, and the relay board 20 and the connector 22 described below are accommodated in the inner space S3.

The inner space S3 formed inside the cover 10 is filled with a resin R1, and the resin R1 is solidified. Further, an opening end side of the large diameter portion 12 is filled with a resin R2 in a mode in which the pressure detection unit 300 is covered with the resin R2, and the resin R2 is solidified.

These resins R1 and R2 prevent water, etc. from penetrating into the cover 10 to protect an electric system of the relay board 20, etc.

Similarly to Embodiment 1, the relay board 20 is formed as a baking board, a glass epoxy board, a ceramic board, or a flexible board, and one end of the connector 22 is attached to a central portion of the relay board 20. One end of the connector 22 is attached to the relay board 20, and the lead wire 24 extending to an outside of the cover 10 is attached to the other end of the connector 22.

In addition, each of the one ends of the plurality of terminal pins 360 to 366 protruding from the base 310 of the pressure detection unit 300 is anchored to a via electrode of the relay board 20 by penetrating thereto.

Similarly to Embodiment 1, the fluid inlet pipe 30 is a pipe-shaped member made of a metal material and includes an attachment portion 32 attached to the receiving member 320 of the pressure detection unit 300 and a connection portion 34 connected to a pipe through which a fluid subjected to pressure detection flows.

The attachment portion 32 is attached to the opening 323 of the receiving member 320 illustrated in FIG. 5 using an arbitrary scheme such as welding, adhesion, mechanical fastening, etc.

When the pressure sensor 1 illustrated in FIG. 6 is assembled, first, the relay board 20, to which the connector 22 is attached, is anchored to the one ends of the plurality of terminal pins 360 to 366 protruding from the base 310 of the pressure detection unit 300.

Meanwhile, the attachment portion 32 of the fluid inlet pipe 30 is attached and fixed to the opening 323 of the receiving member 320 of the pressure detection unit 300.

Subsequently, the pressure detection unit 300 is inserted into the large diameter portion 12 of the cover 10 such that the lead wire 24 is exposed to the outside through the small diameter portion 14 by being inserted from the large diameter portion 12. Thereafter, the resin R1 is injected from the opening of the cover 10 on the small diameter portion 14 side, and the resin R1 is solidified, thereby sealing the inner space S3.

Similarly, the resin R2 is injected from an opening end on the large diameter portion 12 side, and the resin R2 is solidified, thereby fixing the pressure detection unit 300 inside the cover 10.

When these configurations are included, in addition to the effect described in Embodiment 1, the pressure detection unit 300 according to Embodiment 2 of the invention and the pressure sensor 1 to which the pressure detection unit 300 is applied may ensure more reliable air tightness and water tightness of the pressure detection unit 300 since the overlapping portion of the base 310 and the receiving member 320 (or the ring member 340) is not exposed by caulking, fixing, and integrating the base 310 and the receiving member 320 from the outer circumferential side using the caulking member 390.

In addition, the base 310 and the ring member 340 may not be brazed, that is, the diaphragm 330 may be interposed between the receiving member 320 and the ring member 340 and subjected to girth welding separately from the base 310, and thus it is possible to miniaturize equipment for girth welding, and to improve dimensional accuracy.

The invention is not restricted to the above respective embodiments, and various alterations may be made.

For example, Embodiment 1 describes a case in which the second brazing portion B2 is formed after the first brazing portion B1 is formed. However, the first brazing portion B1 and the second brazing portion B2 may be formed in the same process when brazing materials for forming these brazing portions have the same or substantially the same melting temperatures.

In this way, time required to manufacture the pressure sensor may be drastically reduced.

In addition, Embodiment 1 to Embodiment 3 describe that the diaphragm 130 (230, 330) and the ring member 140 (240, 340) are interposed between the base 110 (210, 310) and the receiving member 120 (220, 320). However, it is possible to employ a structure in which the diaphragm 130 (230, 330) is directly interposed between the base 110 (210, 310) and the receiving member 120 (220, 320) without the ring member 140 (240, 340) interposed therebetween by selecting an appropriate joining technology between the base 110 (210, 310) made of the ceramic material and the diaphragm 130 (230, 330) made of the metal material.

In this way, it is possible to reduce manufacturing cost and material of the ring member 140 (240, 340), and to attempt a weight reduction of the whole pressure detection unit 100 (200, 300).

In addition, Embodiment 1 to Embodiment 3 describe a case in which the metal layer 180 (280, 380) formed in the base 110 (210, 310) is formed in a circular region that encloses the semiconductor type pressure detection device 150 (250, 350). However, a region which the metal layer 180 (280, 380) is formed is not restricted to the circular region. For example, the metal layer 180 (280, 380) may be formed in a polygonal region of a rectangle, a pentagon, etc. or only in a region around the earth terminal pin 160 (260, 360).

Further, disposition of the plurality of terminal pins attached to the base 110 (210, 310) by penetrating thereto is not restricted to a mode in which the base 110 (210, 310) is disposed around the semiconductor type pressure detection device 150 (250, 350), and the terminal pins may be disposed at certain positions in the inner portion 114 (214, 314) of the base 110 (210, 310). In addition, an integration structure based on the caulking member 390 used in Embodiment 3 may be applied to the pressure detection unit 200 based on the three terminal pins described in Embodiment 2.

In this way, it is possible to enhance a degree of freedom of a layout of the metal layer and the terminal pins in the pressure detection unit 100 (200, 300).

EXPLANATIONS OF LETTERS OR NUMERALS

1 . . . pressure sensor
10 . . . cover
20 . . . relay board
22 . . . connector
24 . . . lead wire
30 . . . fluid inlet pipe
100, 200, 300 . . . pressure detection unit
110, 210, 310 . . . base
112, 212, 312 . . . outer circumferential portion
114, 214, 314 . . . inner portion
120, 220, 320 . . . receiving member
121, 221, 321 . . . cylindrical portion
122, 222, 322 . . . flange portion
123, 223, 323 . . . opening
130, 230, 330 . . . diaphragm
140, 240, 340 . . . ring member
150, 250, 350 . . . semiconductor type pressure detection device
152, 252, 352 . . . support substrate
154, 254, 354 . . . pressure detection element
160, 260, 360 . . . earth terminal pin
162, 262 . . . power input terminal pin
164, 264, 364 . . . signal output terminal pin
166, 366 . . . adjustment terminal pin
168, 268, 368 . . . bonding wire
170, 370 . . . ball
390 . . . caulking member
392 . . . sealing member

The invention claimed is:

1. A pressure detection unit comprising:
a base formed in a lid shape and made of ceramic;
a receiving member formed in a plate shape;
a diaphragm interposed between the base and the receiving member;
a semiconductor type pressure detection device installed on a side of a pressure receiving space formed between the base and the diaphragm in the base; and
terminal pins electrically connected to the semiconductor type pressure detection device, the terminal pins penetrating the base,
wherein a first brazing portion is formed between the base and the terminal pins,
a metal layer is provided in a region around the semiconductor type pressure detection device on a surface of the base on the side of the pressure receiving space,
the pressure receiving space is filled with a liquid medium having an insulating property,
a ring member is further interposed between the base and the diaphragm,
the diaphragm is interposed between the receiving member and the ring member,
a second brazing portion is formed between the base and the ring member, and
the receiving member and the ring member are integrated by welding.

2. The pressure detection unit according to claim 1, wherein the terminal pins include an earth terminal pin electrically connected to an earth pad of the semiconductor type pressure detection device, and a signal output terminal pin electrically connected to a signal output pad of the semiconductor type pressure detection device,
the earth terminal pin is electrically connected through the metal layer and the first brazing portion.

3. The pressure detection unit according to claim 2, wherein a metallized layer is further formed between the base and the first brazing portion.

4. The pressure detection unit according to claim 1, further comprising
a caulking member that caulks and integrates the base and the receiving member from outer circumferential sides.

5. The pressure detection unit according to claim 1, wherein a metallized layer is further formed between the base and the second brazing portion.

6. A pressure sensor comprising:
the pressure detection unit according to claim 1;
a cover attached to wrap the pressure detection unit from an outer circumferential side;
a lead wire having one end electrically connected to a terminal pin of the pressure detection unit and the other end protruding to an outside of the cover; and
a fluid inlet pipe attached to a receiving member of the pressure detection unit.

* * * * *